July 25, 1933.                J. R. CHAMBERLAIN                1,920,000
SPRING SHACKLE
Filed Dec. 4, 1930
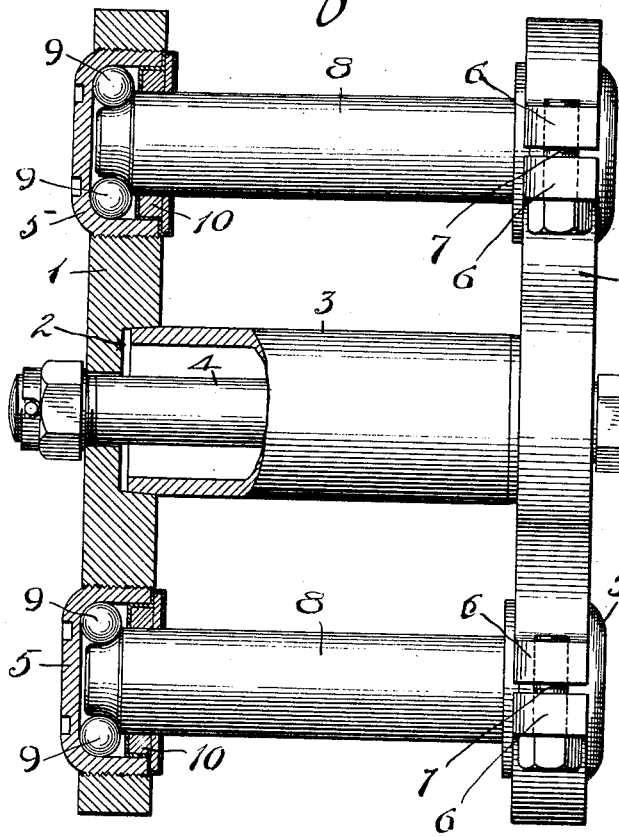
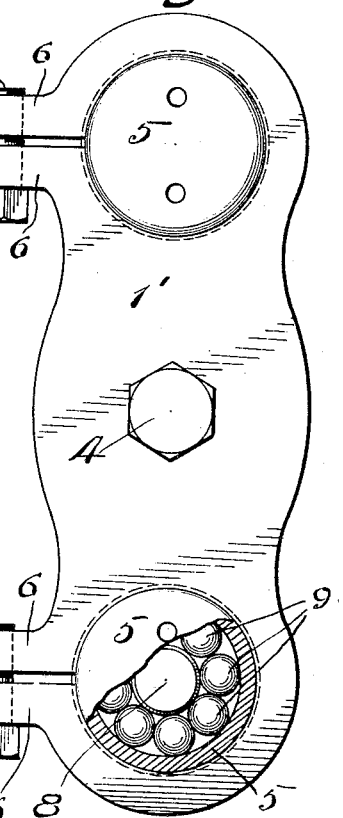
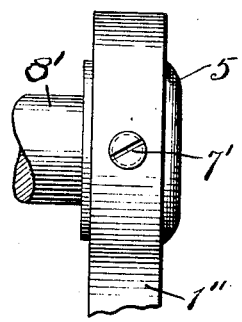
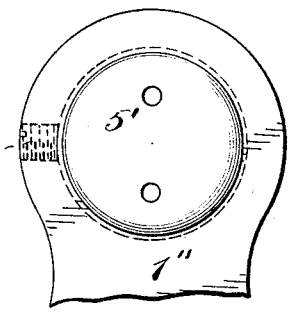
INVENTOR
J. R. Chamberlain
BY
Mitchell Bechert
ATTORNEYS Patented July 25, 1933

1,920,000

UNITED STATES PATENT OFFICE

JAMES ROBINSON CHAMBERLAIN, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING SHACKLE

Application filed December 4, 1930. Serial No. 499,934.

This invention relates to certain new and useful improvements in vehicle spring shackles and particularly to a shackle designed to carry anti-friction bearing elements.

Among the objects of the invention are, to provide a construction that may be economically and rapidly produced, quickly and easily assembled, and which, when assembled, is exceedingly rigid.

Other objects will appear to the mechanic skilled in this art from a reading of the following specification and an examination of the accompanying drawing, in which—

Fig. 1 is a front elevation of the complete shackle and bearing pins therefor with certain parts broken away and shown in section;

Fig. 2 is an end elevation of the shackle shown in Fig. 1, also partly broken away and in section;

Fig. 3 is a front elevation of part of a shackle showing a modification;

Fig. 4 is an end elevation of the parts shown in Fig. 3.

Briefly stated, in a preferred form of the invention, I employ shackle links having raceways for anti-friction bearing members at spaced points thereon. The parts to be shackled together, for example, the spring and frame of a motor vehicle, carry bearing means having raceways complementary to those of the shackle links. Anti-friction bearing members are interposed between complementary raceways. A spaced member for the links is interposed between the links, and the link and spacer have interfitting tapered parts so that when the links are drawn together the tapered parts bind tightly and hold the links rigidly to each other.

In the form shown in Figs. 1 and 2, 1—1' represent two shackle links, and since both links may correspond, a description of one will be sufficient. Each link has on its inner side and substantially midway between its ends a tapered recess 2 designed to tightly receive the tapered end of a tubular spacer 3. 4 is a bolt which passes through both links and through the spacer 3 so as to draw the links towards each other and into tight jamming engagement with said spacer whereby said links will be rigidly held not only in spaced relation but against independent turning or twisting movement. At each end of each link is an anti-friction bearing raceway, which, in the form shown, is formed separately and includes a cup 5, the outside of which may be screw threaded to take into a threaded passage in the link. By turning the cup, the bearing element may be moved to and fro for adjustment purposes. Each end of each shackle link may be split at the side of each recess in which the bearing elements are mounted, and lugs 6—6 may be provided to receive a clamping screw 7, which, when the bearing element adjacent thereto has been properly adjusted, may be set up so as to clamp the bearing element firmly in its adjusted position.

While the passages through each link for the through bolt 4 may be made small so as to not unduly weaken said link, the shallow tapered cavity for the spacer sleeve 3 may be very much larger, whereby a spacer sleeve of much greater diameter than the bolt may be employed as shown so that very great resistance to twisting strain is provided, thus guaranteeing that the links will be held in proper alignment even when subjected to the hardest usage.

8—8 indicate bearing members such as pins, the ends of which may be properly shaped to form ball races. 9—9 are balls within the cup 5, the interior of which may be provided with a ball race, integral or otherwise, in which the balls 9—9 rest so that when the parts are all assembled, the shackle links will turn freely on the ends of the pins 8—8. 10 is a suitable seal at the inner end of each bearing cup and surrounding the adjacent part of the pin extending into said bearing element to exclude dust and dirt and retain lubricant.

To assemble the parts thus far described, it will be apparent first that the pins 8—8 are forced into the parts (not shown) to be connected by the shackle, each end of each pin projecting from said parts so as to be engageable by the links. The two links 1—1' are then applied over the ends of the pins 8—8 and over the ends of the spacer 3. The through bolt 4 is then applied and drawn up so as to force the links tightly onto the ends of said spacer. Finally, the bearing elements at each end of each link are properly adjusted, and each clamping screw 7 is then tightened up.

In Fig. 3 I have shown a modification of the means for holding the bearing elements in their adjusted positions. In this form, the ends of the links are not split, but, instead, I provide a clamping screw which pierces the edge of each link so that the inner end of the screw will engage the outer wall of the cup portion of the anti-friction bearing device adjacent thereto. In these views, 1'' represents one end of one of the links. 5' represents the cup portion of an anti-friction bearing adjustable in the end of the link. 7' represents the clamping screw to hold said element in its adjusted position, and 8' represents one end of one of the pins.

If desired, the spacing element 3 may be of very substantial diameter and hence take a broad firm bearing at each end in the opposite links so as to hold the same properly spaced and against independent movement. Inasmuch as the spacer is hollow, the weight of the same is greatly reduced as compared with a solid spacer of corresponding diameter.

While specific forms of the invention have been illustrated, it is to be understood that various changes, modifications, additions, and omissions may be made without departing from the spirit of the invention as defined in the appended claim.

I claim:

In a spring shackle, the combination of two links, a pair of complementary anti-friction bearings in each of said links, one of said bearings of each pair being adjustable to and fro relatively to the other, a bolt passage through said links substantially midway in the length of each, a bolt therefor, a spacer sleeve of greater internal diameter than the external diameter of said bolt, the ends of said sleeve being tapered, a relatively shallow recess in the inner wall of each of said links having a tapered wall substantially concentric with said bolt passage for receiving the adjacent end of the spacer sleeve.

JAMES ROBINSON CHAMBERLAIN.